Inventor:
Erhard LANGECKER
Attorney:
Karl F. Ross

Inventor:
Erhard LANGECKER
Attorney:
Karl F. Ross

United States Patent Office 3,522,629
Patented Aug. 4, 1970

3,522,629
EXTRUSION PRESS FOR THE MANUFACTURE OF HOSES OR TUBES MADE OF THERMOPLASTIC MATERIAL
Erhard Langecker, Hohbuschener Weg 5, Meinerzhagen, Westphalia, Germany
Filed June 18, 1968, Ser. No. 737,936
Claims priority, application Germany, June 21, 1967, L 56,803
Int. Cl. B29d 23/04
U.S. Cl. 18—14
14 Claims

ABSTRACT OF THE DISCLOSURE

An extruding press for making pipes of hoses. Plasticized material is carried through a channel into a groove in a tube head. The groove is eccentrically disposed in the tube head so that the cross section decreases from the portion closest to the channel to the portion opposite the channel. A sleeve having a tapered end is disposed on an annular piston and is adjustable in order to regulate a throttle gap which in turn regulates the flow to the die. The device also includes a control mechanism for automatically regulating the flow of plasticized material.

---

The invention relates to a device for manufacturing hoses or tubes of thermoplastic material.

Extrusion presses of this type are known, in which the plasticized material is conveyed from the screw conveyor and deflected to a damming chamber arranged in the hose head, formed by an axially displaceable annular piston. The supply of the plasticized material takes place above the piston displacement of the annular piston to the mandrel of the die where it is deflected from the horizontal into the vertical axis of the tube head; as is customary with tube heads having a 'cardioid' mandrel.

This mass flow chamber is surrounded by a jacket, the outer periphery of which forms the inner diameter of the annular damming chamber. By this arrangement the material flowing into the damming chamber contacts the end face of the annular piston only in its lowest position. In addition, the inflowing material does not flow over the cylindrical contact surfaces of the annular piston, so that on dye change or mass change, these contact surfaces are not cleaned by normal rinsing out. A further disadvantage of this arrangement is that with unavoidable lack of sealing at the contact surfaces of the annular piston, the issuing material can in no case pass to the outside air. A further disadvantage is that an approximately uniform distribution of the material flowing into the annular chamber is only possible with a predetermined cross section of the flow paths with a material having a predetermined viscosity and conveying speed, since the cross-section of the flow paths in such devices cannot readily be adjusted. Accordingly, the uniform supply of material is considerably disturbed when adjustment of the conveying speed or change in material to one having a different viscosity. With reduction of the conveying speed, or with use of a less viscous material, there is more material on the portion of the annular chamber adjacent the plasticizing conveyor screw than on the side opposite, which causes a defective tube to be formed because of the non-uniform length of time the plasticized material spends in the damming chamber. With higher conveying speed, there is heavier loading of the screw drive, and in addition the friction heat is increased, so that the temperature and accordingly the plastic condition of the material suffers.

The invention is based on the distribution of the plasticized material to the damming chamber through an annular groove around the piston. The invention seeks to overcome the disadvantages of known devices and to obtain a constant, uniform distribution of the plasticized material in the annular chamber, irrespective of the viscosity of the said material and the speed at which it is conveyed.

The invention consists in a tube head for an extrusion press comprising a piston axially displaceable in the tube head, means for conveying plasticized material through a channel into the tube head characterized in that the said channel opens into an annular groove surrounding the piston which in turn is connected to a throttle gap, and a sleeve mounted on the piston for adjusting the size of the throttle gap to thereby adjust the flow of plasticized material through the throttle gap towards the die.

By the use of an adjustable throttle gap, the entire cross-section of the throttle gap can be set for the desired conveying speed and viscosity, thereby a uniform mass flow into the annular chamber is attained.

A further advantage of the present device is that with the arrangement of an annular piston carried on the die core, the sleeve rests sealingly on the outer surface of the annular piston and has an end face which tapers conically towards the annular piston. Accordingly, the material adhering to the surface on the return of the annular piston is stripped off by the sleeve and cannot enter into the annular groove. Without this arrangement the material will be stripped by the piston and concentrated, by the material arriving from the extruder, on the portion opposite the extruder which causes the material to adhere to the piston, as a result of the concentration in the annular groove opposite the material intake strips in the hose or tubes are formed. In the present device the material stripped by the annular piston is distributed by the inflowing new material over the entire periphery of the annular chamber, with the result that the said unwanted strip formations on the tube cannot form, so just as the outer contact surface of the annular piston has new, inflowing material flowing over it. By the arrangement of the device the inner contact surface of the annular piston has the new, inflowing material flowing over it and is cleaned in the direction towards the die. Also, if there is lack of sealing at the inner and outer contact surfaces of the annular piston, this arangement permits the leaking material to gain outlet upwardly to the atmosphere.

A further feature of the present device is that the annular groove is arranged eccentrically to the die core in such a way that its cross-section decreases from the entry place of the screw uniformly on both sides to the place lying diametrically opposite the said entry place. By this eccentric arrangement of the annular groove in accordance with the invention it is obtained that there is uniform flow speed of the plasticized material inside the annular groove and accordingly the formation of dead spaces is prevented. With a concentrically arranged groove the flow speed in the annular groove will decrease as the more the material of the portion opposite the channel flows downwardly from the annular groove. By the continuous reduction in cross section provided by the eccentric arrangement, the flow speed is kept constant and uniform on both sides of the annular groove in spite of the material flowing away from the annular groove. By the eccentric arrangement of the annular groove with a fixed throttle gap there is uniformity of the material flowing from the annular groove into the annular chamber of the tube head. However, in order to obtain a uniform supply of the material to the annular chamber of the tube head with changing conveying speed and/or changing viscosity, it is particularly advantageous to use, in addition to the eccentric arrangement an adjustable throttle gap.

The present device has the further characteristic that the annular groove at the portion lying opposite the channel has a guide member sealingly engaging the external surface of the sleeve which sleeve can be installed in the tube head. By the arrangement of the known guide member in sealing abutment on the external surface of the sleeve the plasticized at the place of the flowing together in the annular groove is deflected into the annular chamber without forming resting material. In this connection a particularly advantageous fact is that the sleeve and the guide member abut against each other without relative movement, so that there is no friction and accordingly no wear on the guide member which permits firm contact of the guide member with the sleeve and accordingly satisfactory sealing at the place of flowing together in the annular groove.

A further important feature of the present device is that the die core carried in the axially movable piston and/or the axially movable sleeve is itself constructed to be adjustable in the axial direction. Accordingly the die gap may be adjusted by the die core.

A further feature of the present device is in that the annular piston is constructed as hollow sleeve and at its rear end carries a drive device, actuable as a function of the piston stroke as a control device. The drive device includes a rodding having a rack which has associated with it a fixedly mounted pinion, which by switch cams fixed to its shaft is provided for the actuation of a plurality of switches used for the programme control of the press. The pinion in relation to the shaft is steplessly fixable in the direction of rotation in any angular position. The drive device in accordance with the invention and the control device which it actuates, makes it possible to carry out the customary control programme as a function of the piston stroke, i.e. to effect the necessary switch processes of the machine and the die adjustment or pressure head alteration during the movement of stroke of the piston. The actuation device and control device have the feature that the cam settings undertaken on the control device can match the piston movement. When the control programme on the control device is fixed by setting the various cams, as a rule the piston will not be located in its lowest position. By simple release of the pinion it is possible, without altering the position of the cams in relation to each other and to the switches, to transfer the piston to its lowest position and then to fix the pinion on the control shaft, so that the necessary control programme takes place.

The invention is not restricted to use in extrusion presses or blowing machines, but may be used in injection moulding machines which do not have an annular die, since the advantages resulting from the present device are equally advantageous in these environments.

The invention will now be described with reference to the accompanying drawings wherein.

Figure 1:
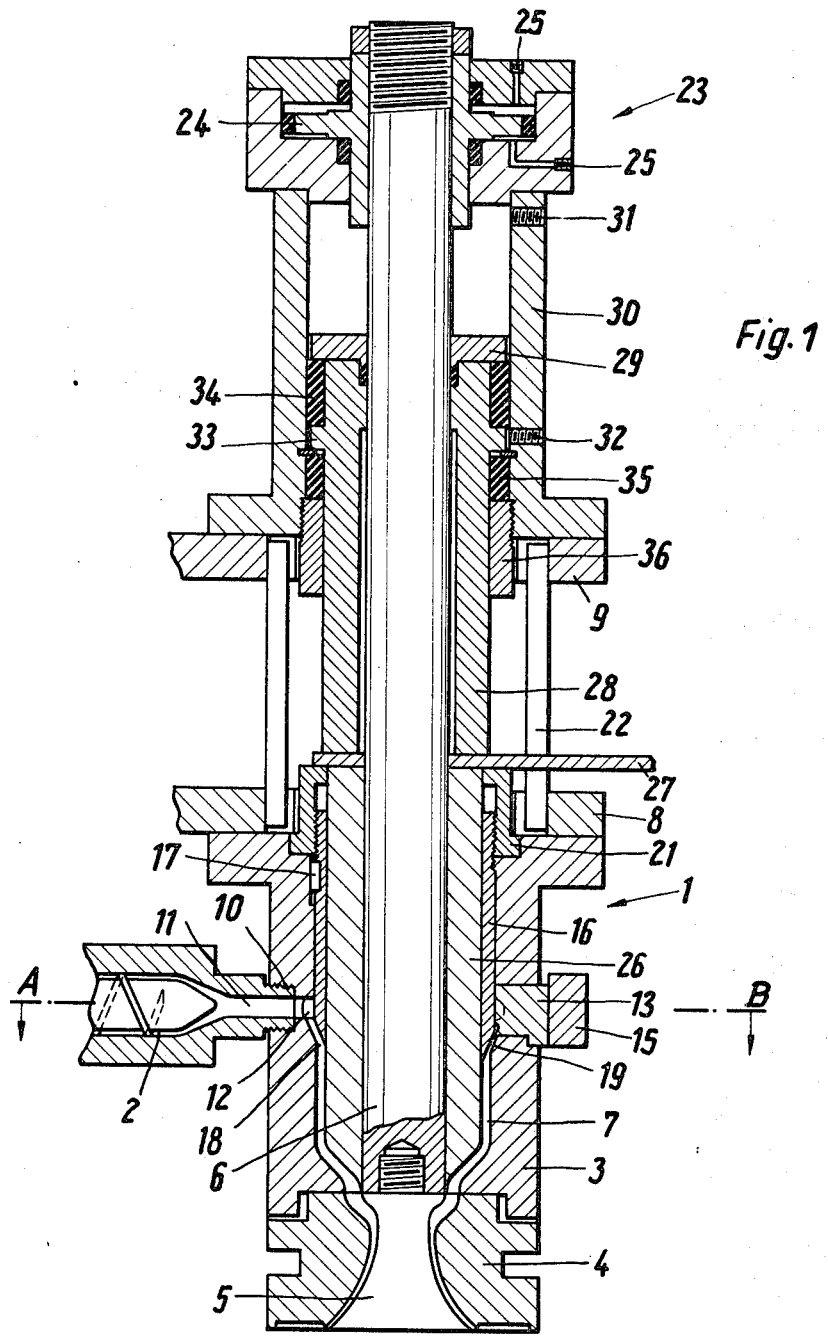
FIG. 1 shows a longitudinal section through a pressure head.
Figure 2:
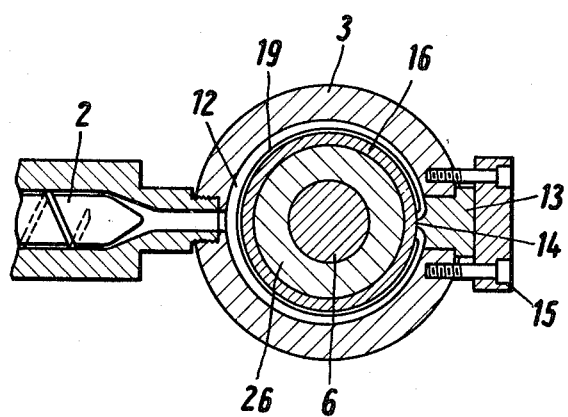
FIG. 2 is a cross section along the line A—B of FIG. 1.

FIGS. 1 and 2 show a pressure head having a tube head 1, which is equipped with a transversely directed plasticizing element 2. The tube head 1 consists of a tube head jacket 3, to which the die jacket 4 is connected. The die jacket 4 surrounds the die mandrel 5 with the formation of an annular gap, the die mandrel being fixed to the die core 6. An annular piston 26 is arranged on the die core 6, and on the annular piston 26 is a sleeve 16.

The plasticizing element 2 has a screw threaded connecting piece 10 which is screwed into the tube head jacket. The screw threaded connecting piece 10 has an outlet bore 11 for the plasticized material ejected by the plasticizing element 2. The material passes through the outlet bore 11 into an annular groove 12, which is worked eccentrically to the axis of the tube head jacket 3 and to the axis of the die core 6 in the inner wall of the tube head jacket 3. As can be seen from FIG. 2, the annular groove 12 is arranged eccentrically in such a way that its largest cross section is at the position adjacent the outlet bore 11, the cross section is uniformly reduced on both sides and its smallest cross section is at the side opposite the outlet bore 11. The annular groove 12 is advantageously constructed so that the cross section is reduced linearly with respect to the groove circumference.

Figure 3:
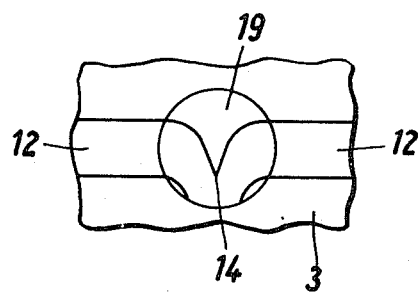
FIG. 3 is a schematic view on an enlarged scale of a guide member.

On the side opposite the outlet bore 11 a guide member 13 is installed in the tube head jacket. As shown in FIG. 3, the guide member has a projection 14 which rests with its top surface on the sleeve 16 and brings about the flow of material from both sides through the annular groove 12 to the guide member 13 and is deflected into the throttle gap 19 without the formation of residue. The guide member is held by the guide member holder 15 which is fixed to the tube head jacket 3 by screws; the contact pressure of the guide member 13 on the sleeve 16 is determined by the amount of turning of the screws.

The sleeve 16 is arranged on the annular piston 26 and is ensured against rotation in the tube head jacket 3 by means of a wedge or key 17. At its front end, the sleeve 16 conically inwardly tapers, and this conical taper 18 forms with the inner wall of an annular throttle gap 19. The throttle gap 19 is connected to the annular damming chamber 7 formed between the die core 6 and the tube head jacket, through which the plasticized material is supplied to the annular die 4, 5.

An adjusting nut 21 is received at the upper end of the tube head jacket 3 threadedly engages the external screw threading of the sleeve 16. On rotation of the adjusting nut 21, the sleeve 16 is raised or lowered in accordance with the direction of rotation which causes the flow cross section of the throttle gap 19 can be increased. This takes place for the purpose of adapting the cross section of the throttle gap to the conveying speed and viscosity of the plasticized material being used. A further advantage of the adjustability of the throttle gap consists in preventing foreign bodies which have entered into the throttle gap 19 from passing freely through the throttle gap 19. Suitable rotation of the adjusting nut 21 can temporarily adjust the throttle gap 19 to such a width that the foreign bodies collected therein to eject same with the plasticized material into the annular chamber; or with a filled damming chamber 7 and by removing the guide member 13 actuation of the tube piston 26 will cause the plasticized material collected in the damming chamber to be ejected through the opening for receiving the guide member 13 and thereby ejected to the atmosphere. In order to externally actuate the adjustment nut 21, webs 22 are welded on between the joining flanges 8 and 9 which form openings through which, by means of a key, the nut 21 can be operated to adjust the throttle gap 19.

The tube piston 26 is between the sleeve 16 and the die core 6 in the damming chamber 7 which is adapted to increase or decrease the volume of the pressure chamber 7 by axial displacement. A hydraulic cylinder 30 having a tube piston 28 is connected to the tube piston 26 of the tube head 3 and is connected to the flange 9. A piston cylinder arrangement 23 is connected to the hydraulic cylinder 30, and the piston 24 of this arrangement 23 is connected to the die core 6, so that the die core 6 can be lifted and lowered for adjusting the dies of the annular die gap by the supply of pressure medium through one of the lines 25.

At the upper end of the tube piston 26 a horizontal actuating rod 27 is positioned which is used for actuating a control device, as will be described below. A hydraulic piston 28 is connected to the tube piston 26 above the actuating rod 27; hydraulic piston 28 is used for operating the tube piston 26. The tube piston 26 has a piston collar 33. A sealing sleeve 34 is arranged above the collar which is clamped between the collar 33 and the cover 29, which on the raising and lowering of the tube piston 26 slides on the inner wall of the hydraulic cylinder 30. At the upper end of the hydraulic cylinder 30 there is a connecting piece 31 for the pressure medium line for the lowering movement of the tube piston 26. In the lower region of the hydraulic piston 28 there is a connecting piece 32 for a further pressure medium line, for raising the tube piston 26. Underneath the connecting piece 32 there is a sealing sleeve 35 abutting against an abutment. This sleeve 35 is held in sealing abutment against the hydraulic piston by a contact screw 36.

Figure 4:
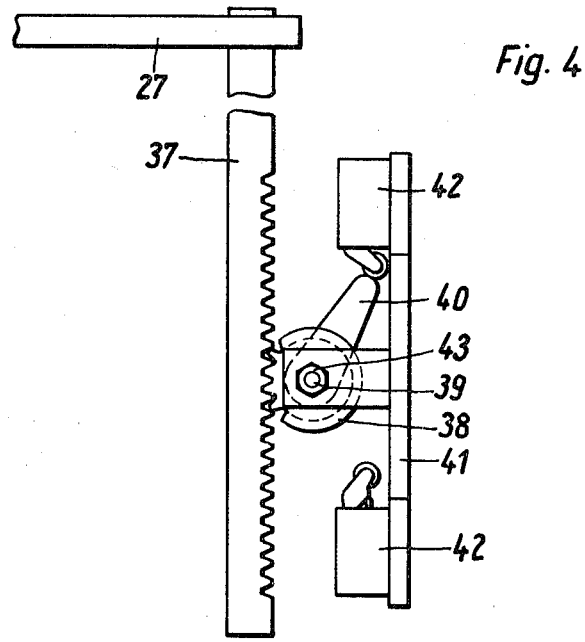
FIG. 4 is a side elevation view of the actuating device and of the control device.
Figure 5:
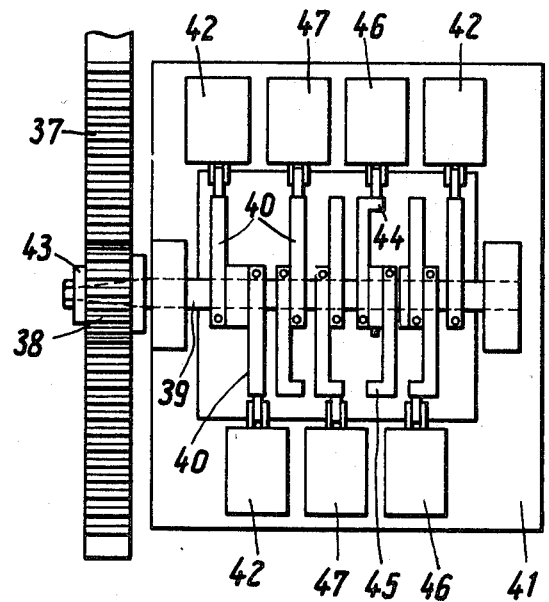
FIG. 5 is a side view of the device shown in FIG. 4.

As can be seen from FIG. 4, a perpendicular rack 37 is fixed to the actuating rod 27, and on the stroke movement of the annular piston 26 the rack 37 is moved up and down, hereby rotating a pinion 38 to which it is entrained. The pinion 38 is fixed to the shaft 39 on a conical seat by a screw 43. Cams 40, 44, 45 are fixed to the shaft 39 and are used for the actuation of the switches 42, 46, 47 which are mounted on a base plate 41. By releasing the nut 43, the pinion 38 can be released with respect to the shaft 39, so that after the setting of the cams 40, 44, 45 on the shaft 39, the annular piston can be moved to its lowest position at which position the pinion 38 is fixedly connected to the shaft by tightening the screws 43. This is done so that the actuation of the switches 42, 46, 47 takes place by the set cams 40, 44, 45 in correct dependence on the stroke movement of the annular piston 26. The switches 42, 46, 47, which are fixed to the base plate 41, are used to programme control the machine. The switches 42 are actuated once by the cam 30 on the stroke movement of the annular piston 26, whereas the switches 47 are in each case actuated twice by the cams 40 and 44, and the switches 46 are in each case operated three times by the cams 40, 44, 45.

I claim:

1. A tube head for an extrusion press comprising a piston axially displaceable in the tube, means for conveying plasticized material through a channel into the tube head characterized in that the said channel opens into an annular groove surrounding the piston which in turn is connected to a throttle gap and a sleeve mounted on the piston for adjusting the size of the throttle gap to thereby adjust the flow of plasticized material through the throttle gap towards a die.

2. A tube head as claimed in claim 1, wherein the sleeve has a conically tapered face.

3. A tube head as claimed in claim 1, wherein a damming chamber is connected between the said throttle gap and the die.

4. A tube head as claimed in claim 1, wherein the means for conveying plasticized material into the tube head is a screw conveyor.

5. A tube head as claimed in claim 1, wherein the throttle gap is of smaller cross section than the annular groove.

6. A tube head as claimed in claim 1, wherein the annular groove is arranged eccentrically in the tube head so that the cross section is uniformly reduced from the channel to that portion of the groove opposite the channel.

7. A tube head as claimed in claim 6, wherein the said portion of the groove opposite the channel includes a guide membed sealingly engaging the external surface of the said sleeve.

8. A tube head as claimed in claim 7, wherein the trottle gap is adapted to be adjusted and the guide member is adapted to be removed in order to clear foreign bodies from the throttle gap.

9. A tube head as claimed in claim 1, wherein the piston is mounted on a die core which is axially adjustable in order to adjust the die gap.

10. A tube head as claimed in claim 9, wherein the end of the piston opposite the die is connected to an actuating rod for a drive device.

11. A tube head as claimed in claim 10, wherein the drive device includes a geared rack and a fixed pinion gear trained to the rack.

12. A tube head as claimed in claim 11, wherein a shaft is fixed to the pinion and is rotatable therewith.

13. A tube head as claimed in claim 12, wherein the drive device operates a control device which includes a plurality of cams mounted on the shaft and adapted to engage switches mounted about the shaft in response to axial displacement of the piston.

14. A tube head as claimed in claim 1, wherein the sleeve is sealingly mounted on the outer surface of the piston and is used as a stripper.

References Cited

UNITED STATES PATENTS

| | | | |
|---|---|---|---|
| 2,633,602 | 7/1953 | Sverdrup | 18—14 |
| 3,078,507 | 2/1963 | Park | 18—14 XR |
| 3,111,713 | 11/1963 | Kaplan | 18—14 |
| 3,147,515 | 9/1964 | Amsden | 18—14 |
| 3,245,111 | 4/1966 | Branscum | 18—14 XR |
| 3,386,132 | 6/1968 | Fischer | 18—14 |

WILLIAM J. STEPHENSON, Primary Examiner